(12) United States Patent
Sokhi et al.

(10) Patent No.: US 12,139,054 B2
(45) Date of Patent: Nov. 12, 2024

(54) CAR SEAT DUAL CONNECTION MECHANISM

(71) Applicant: MONAHAN PRODUCTS, LLC, Rockland, MA (US)

(72) Inventors: Manpreet Singh Sokhi, Attleboro, MA (US); Stephen Alan Kender, Hingham, MA (US); Robert Scott Anderson, Narvon, PA (US)

(73) Assignee: MONAHAN PRODUCTS, LLC, Rockland, MA (US)

( * ) Notice: Subject to any disclaimer, the term of this patent is extended or adjusted under 35 U.S.C. 154(b) by 135 days.

(21) Appl. No.: 18/057,451

(22) Filed: Nov. 21, 2022

(65) Prior Publication Data

US 2024/0166100 A1  May 23, 2024

(51) Int. Cl.
*B60N 2/28* (2006.01)

(52) U.S. Cl.
CPC ......... *B60N 2/2821* (2013.01); *B60N 2/2848* (2013.01)

(58) Field of Classification Search
CPC ............................ B60N 2/2821; B60N 2/2848
USPC ...................................................... 297/256.16
See application file for complete search history.

(56) References Cited

U.S. PATENT DOCUMENTS

| | | | |
|---|---|---|---|
| 6,070,890 A * | 6/2000 | Haut ................. | B60N 2/2821 297/256.16 X |
| 6,367,875 B1 * | 4/2002 | Bapst ................. | B60N 2/2821 297/256.16 X |
| 6,409,205 B1 * | 6/2002 | Bapst ................. | B62B 7/06 297/256.16 |
| 7,070,197 B2 * | 7/2006 | Chen ................. | B62B 7/145 297/256.16 |
| 7,370,913 B2 * | 5/2008 | Takamizu ........... | B62B 7/142 297/256.16 |
| 7,472,955 B2 * | 1/2009 | Crane ................ | B60N 2/2863 297/256.16 |
| 7,484,801 B2 | 2/2009 | Kassai et al. | |

(Continued)

FOREIGN PATENT DOCUMENTS

CN         201890165 U        7/2011

OTHER PUBLICATIONS

International Search Report and Written Opinion from corresponding International Application No. PCT/US2023/034156 dated Feb. 2, 2024.

*Primary Examiner* — Rodney B White
(74) *Attorney, Agent, or Firm* — Lando & Anastasi, LLP (57) ABSTRACT

According to at least one aspect of the present disclosure a car seat release mechanism is provided. The car seat release mechanism comprises a shell; a first base connection mechanism coupled to the shell and configured to secure the shell to a car seat base, the first base connection mechanism having an open position and a closed position; a first stroller connection mechanism coupled to the shell and configured to secure the shell to a stroller, the first stroller connection mechanism having an open position and a closed position, the first stroller connection mechanism including a hook, a latch configured to receive a hook, a stroller securing portion, and a spring configured to bias the stroller securing portion in the closed position; and a handle coupled to an underside of the shell and configured to operate both the first base connection mechanism and the first stroller connection mechanism.

20 Claims, 10 Drawing Sheets

(56) References Cited

U.S. PATENT DOCUMENTS

| | | |
|---|---|---|
| 7,597,396 B2 | 10/2009 | Longenecker et al. |
| 7,735,921 B2 | 6/2010 | Hutchinson et al. |
| 7,862,117 B2 | 1/2011 | Hutchinson et al. |
| 8,056,975 B2 | 11/2011 | Longenecker et al. |
| 8,070,228 B2 | 12/2011 | Karremans et al. |
| 8,172,253 B2 | 5/2012 | Song |
| 8,317,265 B2 | 11/2012 | Hutchinson et al. |
| 8,382,150 B2 | 2/2013 | Williams et al. |
| 8,393,679 B2 | 3/2013 | Longenecker et al. |
| 8,556,344 B2 | 10/2013 | Williams et al. |
| 8,864,166 B2 | 10/2014 | Longenecker et al. |
| 8,876,208 B2 | 11/2014 | Heisey et al. |
| 8,882,196 B2 | 11/2014 | Williams et al. |
| 8,915,547 B2 | 12/2014 | Longenecker et al. |
| 9,090,181 B2 | 7/2015 | Williams et al. |
| 9,119,483 B1 | 9/2015 | Heisey |
| 9,216,670 B2 | 12/2015 | Heisey |
| 9,403,449 B2 | 8/2016 | Longenecker et al. |
| 9,522,615 B2 | 12/2016 | Longenecker et al. |
| 9,676,303 B2 | 6/2017 | Hou et al. |
| 10,058,192 B2 | 8/2018 | Williams et al. |
| 2014/0361589 A1 | 12/2014 | Hou et al. |

\* cited by examiner

CAR SEAT DUAL CONNECTION MECHANISM

BACKGROUND

At least one example in accordance with the present disclosure relates generally to connection mechanisms for car seats. Car seats are seats designed for infants. Car seats typically secure an infant safely in place. Some car seats are designed to attach to a car seat base, the car seat base being directly affixed to part of the car.

SUMMARY

According to at least one aspect of the present disclosure a car seat release mechanism is provided. The car seat release mechanism comprises a shell; a first base connection mechanism coupled to the shell and configured to secure the shell to a car seat base, the first base connection mechanism having an open position and a closed position; a first stroller connection mechanism coupled to the shell and configured to secure the shell to a stroller, the first stroller connection mechanism having an open position and a closed position, the first stroller connection mechanism including a hook, a latch configured to receive a hook, a stroller securing portion, and a spring configured to bias the stroller securing portion in the closed position; and a handle coupled to an underside of the shell and configured to operate both the first base connection mechanism and the first stroller connection mechanism.

In some examples, the car seat release mechanism further comprises one or more base cables coupled to the handle and coupled to the base connection mechanism, such that when the handle is pulled the base connection mechanism is in the open position; and one or more stroller cables coupled to the handle and to the stroller connection mechanism, such that when the handle is pulled the stroller connection mechanism is in the open position. In various examples, pulling the handle operates both the base and stroller connection mechanisms simultaneously. In many examples, the base connection mechanism comprises a joint; a base securing portion rotationally coupled to the joint, the base securing portion including a travel; and a spring coupled to the base securing portion and configured to bias the base securing portion into the closed position. In some examples, the joint includes a flange configured to secure the base connection mechanism to the shell.

In many examples, the base securing portion is configured to rotate with respect to the travel. In various examples, the car seat release mechanism further comprises a second base connection mechanism, wherein the first base connection mechanism is coupled to a first side of the car seat, and the second base connection mechanism is coupled to a second side of the shell. In some examples, the car seat release mechanism further comprises a first base cable coupled to the first base connection mechanism; and a second base cable coupled to the second base connection mechanism. In various examples, the car seat release mechanism further comprises a hook; a latch configured to receive the hook; a stroller securing portion; and a spring configured to bias the stroller securing portion in the closed position. In many examples, the stroller securing portion includes one or more sides; and the latch includes an aperture configured to receive the hook and one or more beveled edges, wherein the one or more beveled edges are slidably positioned relative to the one or more sides.

In various examples, the latch is configured to slide upwards responsive to the handle being operated, such that the stroller securing portion is shifted to the open position. In some examples, the car seat release mechanism further comprises a second stroller connection mechanism, wherein the first stroller connection mechanism is coupled to a first side of the shell, and the second stroller connection mechanism is coupled to a second side of the shell. In many examples, the car seat release mechanism further comprises a first stroller cable coupled to the first stroller connection mechanism; and a second stroller cable coupled to the second stroller connection mechanism.

According to at least one aspect of the present disclose, a car seat connection mechanism is provided. The car seat connection mechanism comprises a shell; and a connection mechanism having: an open and closed position, a stroller connector configured to connect to a stroller and operable between the open and closed positions, the stroller connector including a hook, a latch configured to receive the hook, a stroller securing portion, and a spring configured to bias the securing portion into the closed position, a base connector configured to connect to a car seat and operable between the open and closed positions, and a handle configured to operate the connection mechanism between the open and closed positions.

In some examples, the connection mechanism further comprises at least one stroller cable coupled to the stroller connector; and at least one base cable coupled to the base connector. In various examples, the connection mechanism further comprises a first stroller connector portion on a first side of the shell; a second stroller connector portion on a second side of the shell; a first stroller cable coupled to the handle and to the first stroller connector portion; and a second stroller cable coupled to the handle to the second stroller connector portion. In many examples, the connection mechanism further comprises a first base connector portion on a first side of the shell; a second base connector portion on a second side of the shell; a first base cable coupled to the handle and to the first base connector portion; and a second base cable coupled to the handle and to the second base connector portion.

In various examples, the base connector has a base open position and a base closed position and the stroller connector has a stroller open position and a stroller closed position. In many examples, the handle is configured to operate the base connector between the base open position and the base closed position and is configured to operate the stroller connector between the stroller open position and the stroller closed position. In some examples, the handle is configured to operate the base connector and the stroller connector simultaneously. In many examples, the car seat connection mechanism further comprises a hook; a latch configured to receive the hook; a securing portion; and a spring configured to bias the securing portion into the closed position.

In some examples, the latch includes an aperture configured to receive the hook and at least one beveled edge; the securing portion includes at least one side slidably positioned with respect to the at least one beveled edge; and the at least one stroller cable is coupled to the hook. In various examples, the car seat connection mechanism further comprises a joint; a securing portion rotationally coupled to the joint; and a spring configured to bias the base securing portion in the closed position. In some examples, the securing portion is coupled to the at least one base cable.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Examples of the methods and systems discussed herein are not limited in application to the details of construction and the arrangement of components set forth in the following description or illustrated in the accompanying figures. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Car seats may be designed to connect with car seat bases and with strollers. Strollers and car seat bases often require different connection mechanisms to secure the car seat to the respective stroller or car seat base. Different control mechanisms are used to operate each of the respective connection mechanisms, which is inconvenient. Accordingly, there is a need for a car seat connection mechanism with a single control mechanism that controls both stroller and car seat base connection mechanisms.

Aspects and elements of the present disclosure include a car seat connection mechanism with a single control mechanism that operates both the stroller connection mechanism and the car seat base ("base") connection mechanism. In some examples, the control mechanism is a handle.

In some examples, the control mechanism operates both base and stroller connection mechanisms simultaneously.

Figure 1A:
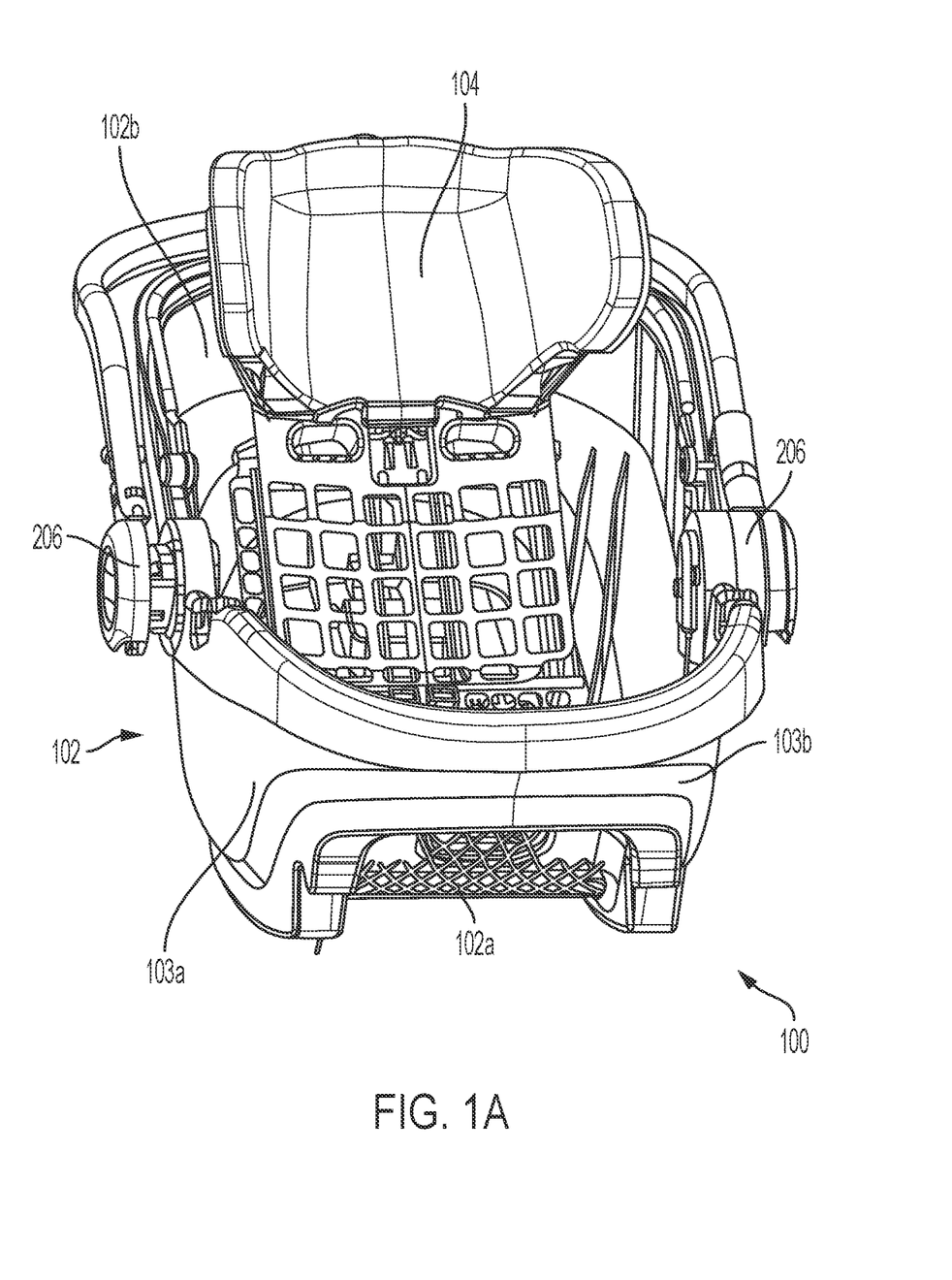
FIG. 1A illustrates a schematic diagram of a car seat according to an example.

Turning to the figures, FIG. 1A illustrates a schematic diagram of a car seat 100 according to an example.

Car seat 100 includes a shell 102 and a headrest 104. Shell 102 is coupled to a connection mechanism 200 discussed below. Also shown are a stroller connection mechanisms 206 of connection mechanism 200. Shell 102 includes a first half 103a and a second half 103b. Shell 102 also includes an underside 102a and a back 102b.

Figure 1B:
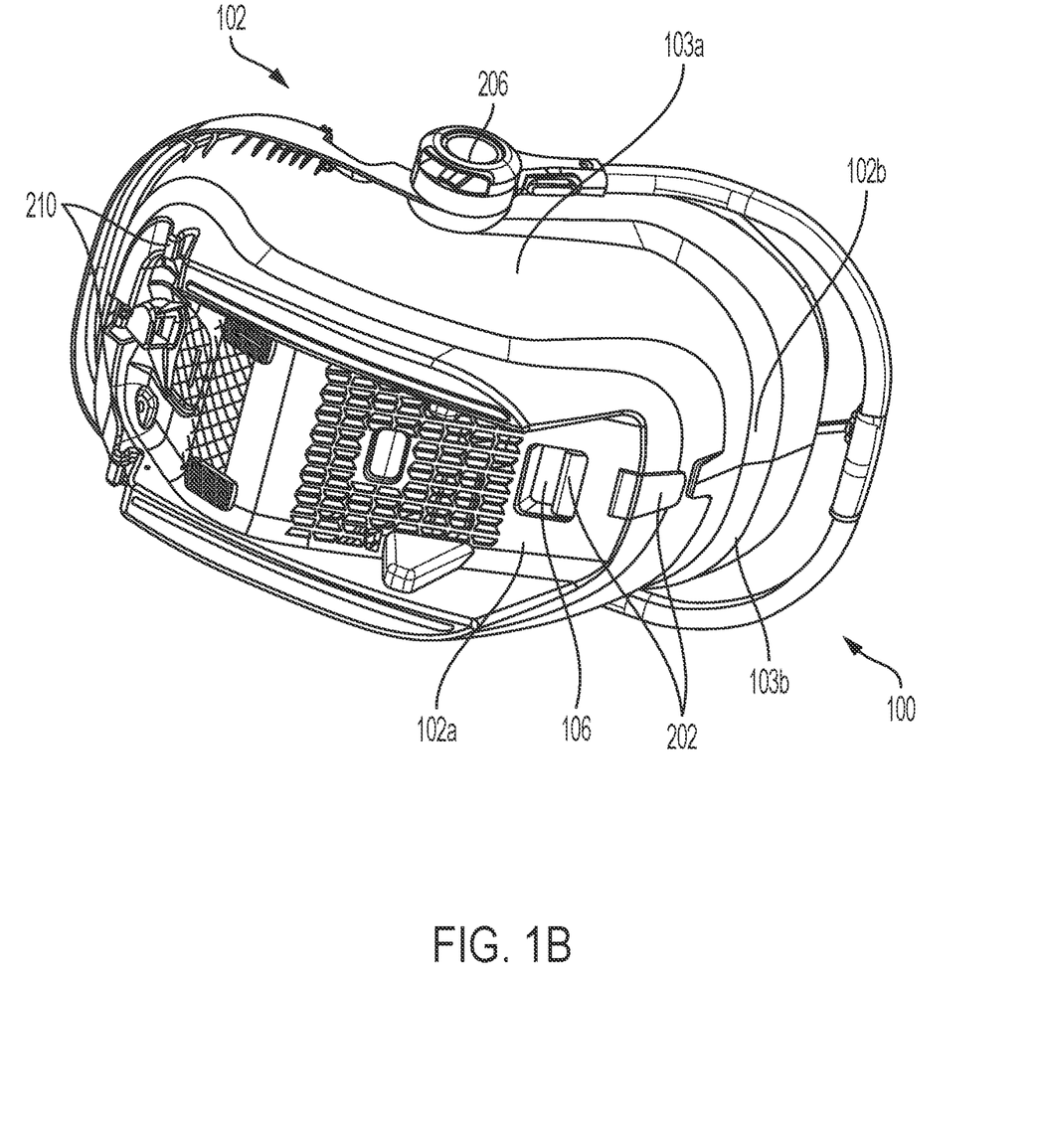
FIG. 1B illustrates a schematic diagram of a car seat according to an example.

FIG. 1B illustrates a schematic diagram of car seat 100 according to an example. Car seat 100 includes a handle 202 and base connection mechanisms 210, discussed in greater detail below. Underside 102a of the shell 102 includes an access 106 for handle 202.

With respect to FIGS. 1A and 1B, handle 202, base connection mechanisms 210, and stroller connection mechanism 206 are all coupled to shell 102.

Figure 2A:
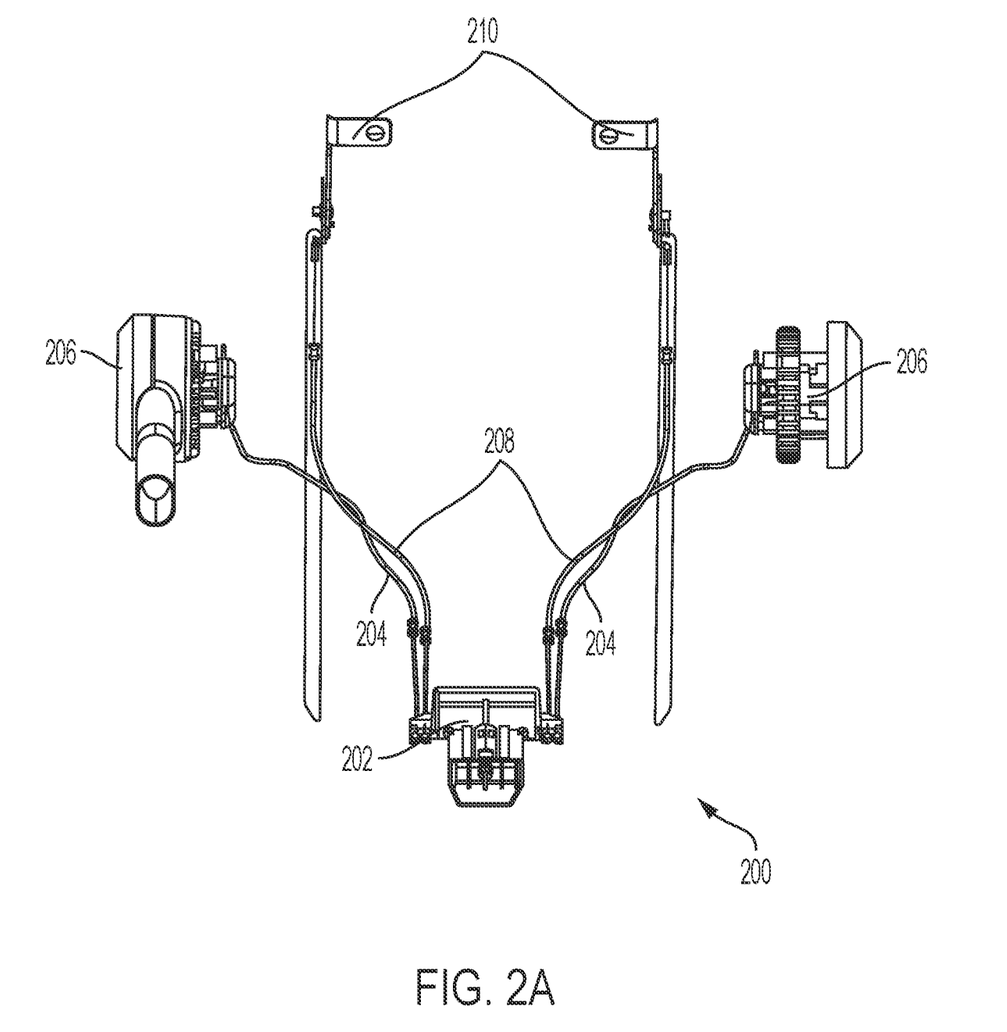
FIG. 2A illustrates a schematic diagram of a connection mechanism for a car seat according to an example.
Figure 2B:
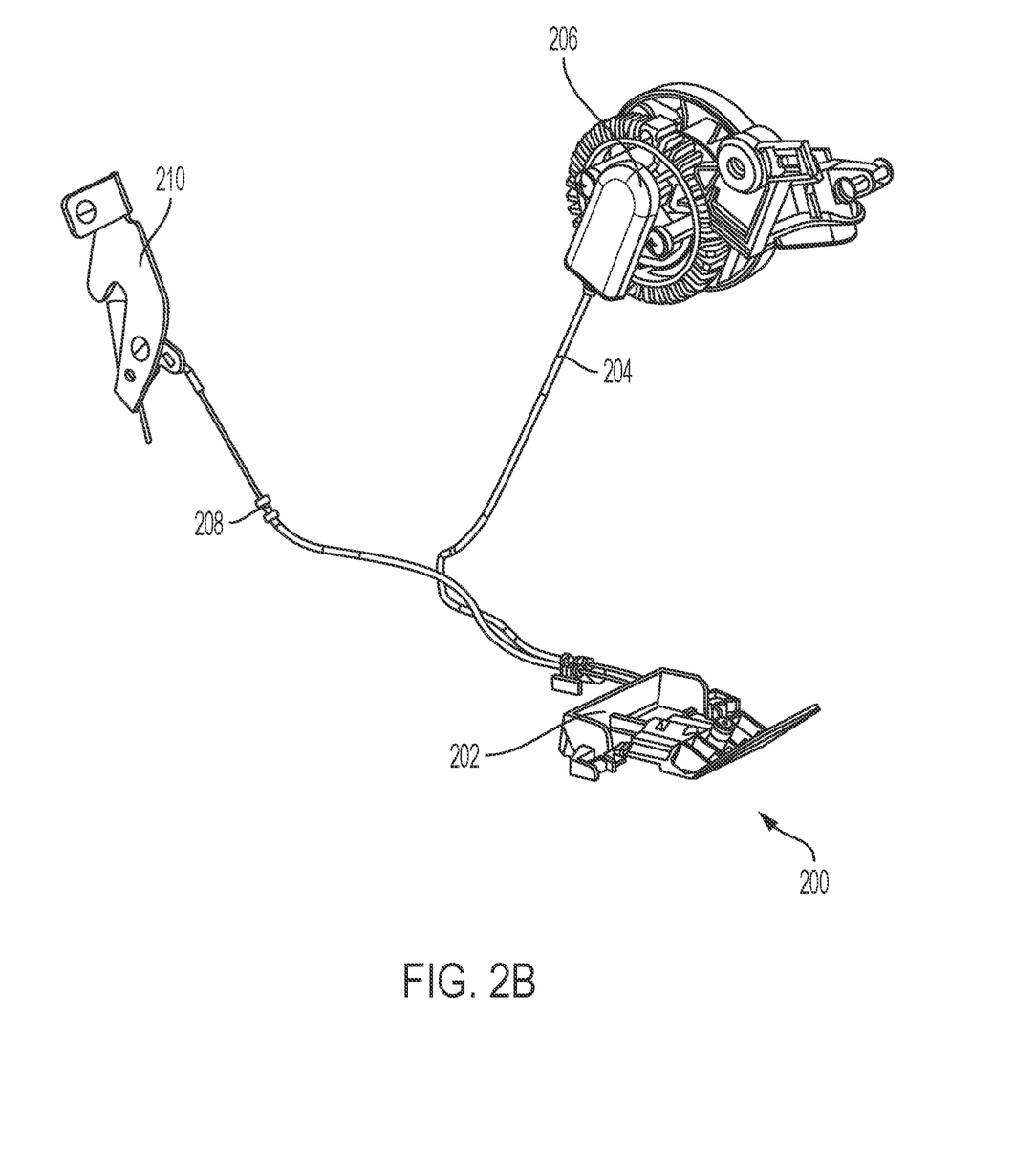
FIG. 2B illustrates a schematic diagram of the connection mechanism from an angle.

FIGS. 2A and 2B illustrate schematic diagrams of a connection mechanism 200 for a car seat according to an example.

FIG. 2A illustrates a schematic diagram of a connection mechanism 200 according to an example. The connection mechanism 200 includes a control mechanism ("handle") 202, one or more stroller cables 204, one or more stroller connection mechanisms 206, one or more base cables 208, and one or more base connection mechanisms 210.

Handle 202 is coupled to each stroller cable 204 and base cable 208. Stroller cables 204 are coupled to stroller connection mechanisms 206. Base cables 208 are coupled to base connection mechanism 210.

Stroller connection mechanisms 206 are located on opposite sides of the shell of the car seat, for example opposite sides of the lateral sides of the shell, and are configured to securely connect the car seat to a stroller. Base connection mechanisms 210 are located on opposite sides of the shell, for example, opposite sides of the bottom of the shell, and are configured to securely connect the car seat to a car seat base.

Operating handle 202, for example by pulling the handle, causes cables 204, 208 to pull on the respective connection mechanisms 206, 210 which cause the connection mechanisms to shift from closed positions to open positions. In some examples, operating handle 202 causes connection mechanisms 206, 210 to shift from closed to open positions simultaneously. Handle 202 may operate both connection mechanisms 206, 210 at the same time.

FIG. 2B illustrates a schematic diagram of connection mechanism 200 with one base cable 208, one stroller cable 204, one stroller connection mechanism 206 and one base connection mechanism 210. The base connection mechanism 210 will be discussed in greater detail with respect to FIGS. 4A-4B. The stroller connection mechanism will be discussed in greater detail with respect to FIGS. 5A-5C.

Figure 3:
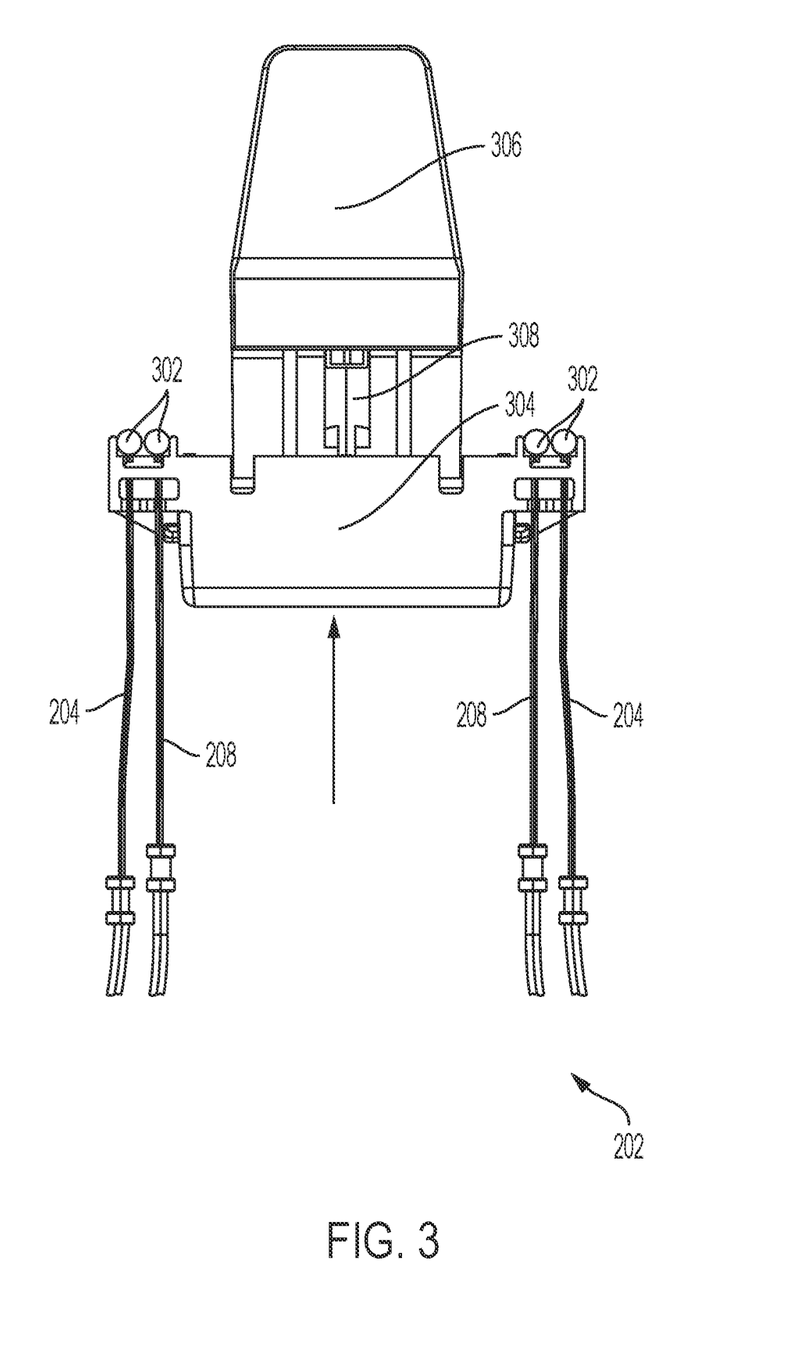
FIG. 3 illustrates a schematic diagram of a handle according to an example.

FIG. 3 illustrates a schematic diagram of handle 202 according to an example. Handle 202 includes a sliding portion 304, a channel 308, and a fixed portion 306. Handle 202 further includes fixing elements 302 for coupling the stroller cables 204 and base cables 308 to sliding portion 304.

Sliding portion 304 is slidably coupled to channel 308. Channel 308 is coupled to fixed portion 306. A user may operate handle 202 by, for example, gripping the sliding portion 304 and sliding the sliding portion 304 in the direction of the fixed portion 306. Sliding portion 304 will slide along channel 308 in, for example, various grooves or abutments designed to facilitate the sliding.

When operated, handle 202 exerts force on stroller and base cables 204, 208 pulling the cables away from the respective stroller and base connection mechanisms 206, 210. As tension is thus increased in cables 204, 208 connection mechanisms 206, 210 are operated and put into the open position.

In one example, handle 202 may be operated by a user placing their fingers in the access 106 along underside 102a, and pressing sliding portion 304 which protrudes into access 106 with their fingers. As sliding portion 304 is pressed by the user in the direction of the back 102b (indicated by the arrow in FIG. 3), the cables 204, 208 are tensioned and thus operate the stroller and base connection mechanisms 206, 210 into the open position.

Figure 4A:
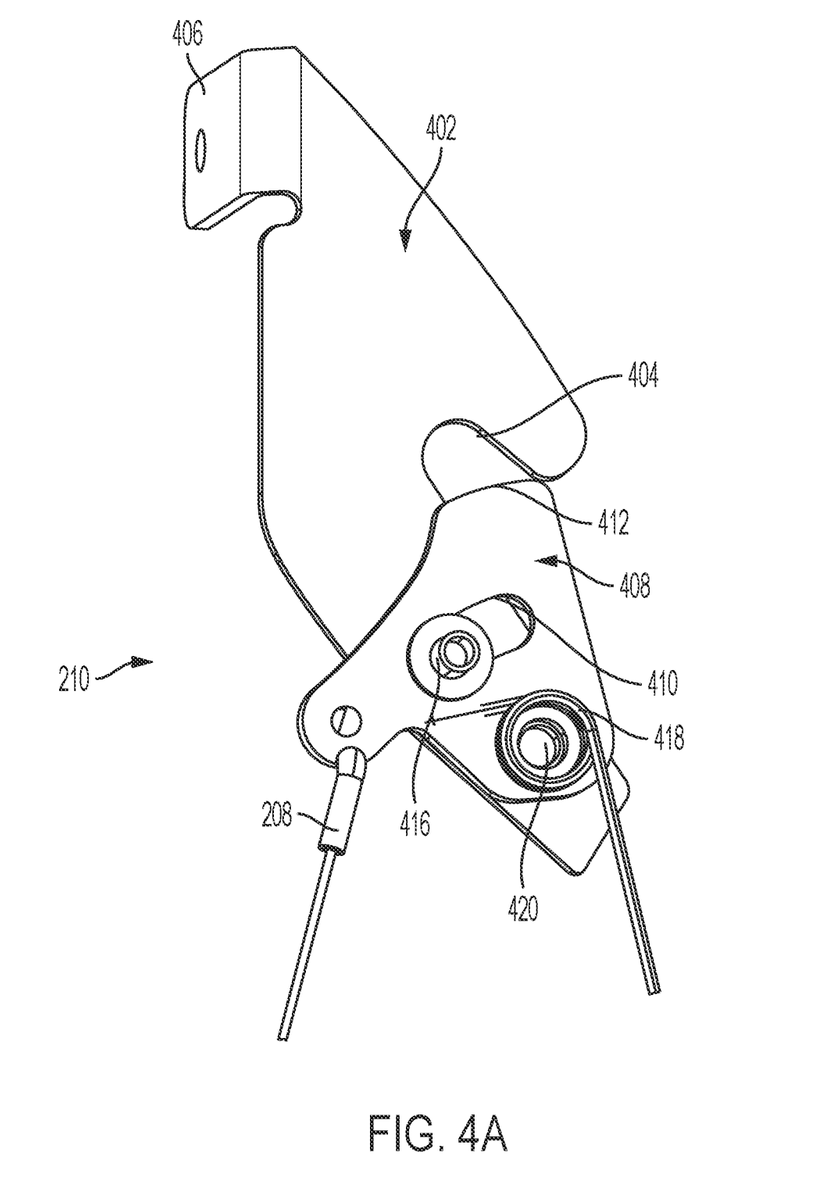
FIG. 4A illustrates a schematic diagram of a base connection mechanism from a first side according to an example.
Figure 4B:
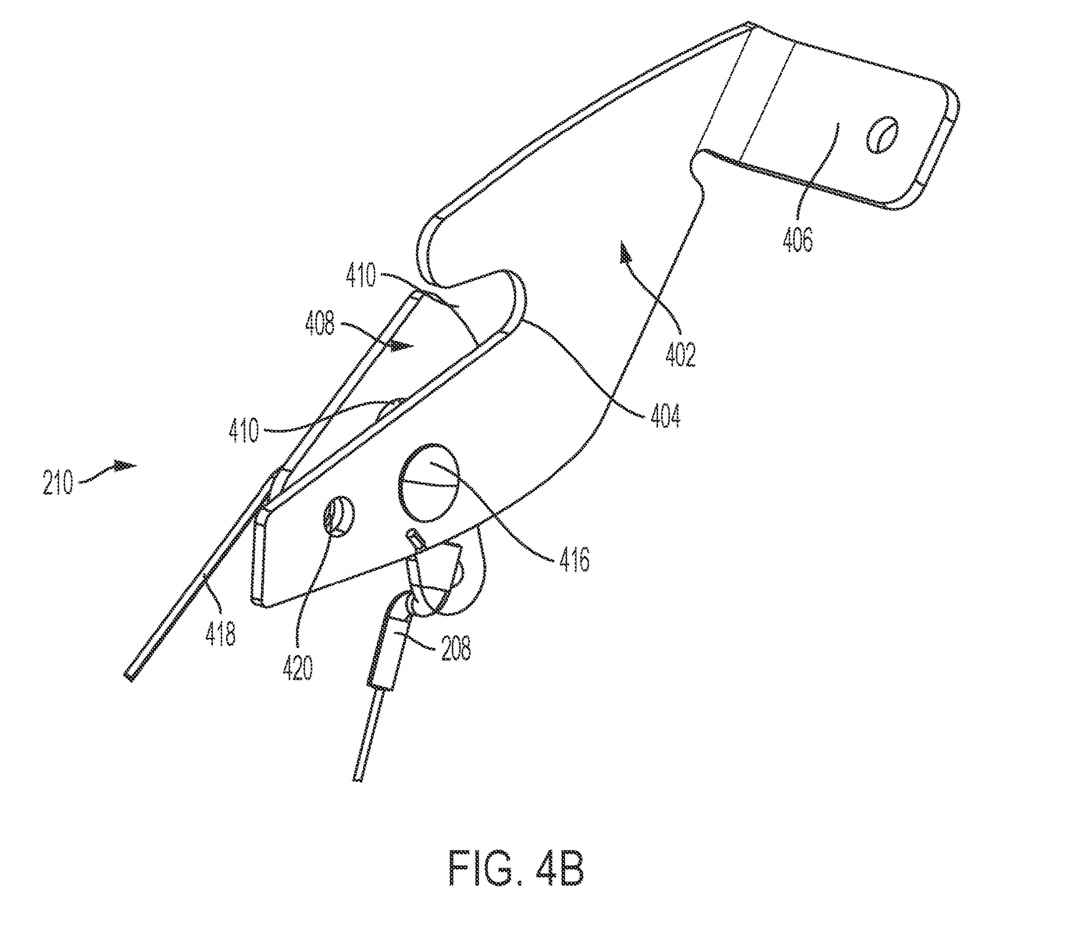
FIG. 4B illustrates a schematic diagram of the base connection mechanism from a second side according to an example.

FIGS. 4A-4B illustrate a schematic diagram of base connection mechanism 210 according to an example.

FIG. 4A illustrates base connection mechanism 210 from a first side. Base connection mechanism 210 includes a joint 402, a base securing portion (securing portion) 408, a fixing element 416, and a spring 418. Joint 402 includes a groove 404 and a flange 406. Securing portion 408 includes a travel 410 and a securing edge 412.

Securing portion 408 is rotationally coupled to joint 402 via fixing element 416 which is situated within travel 410 of securing portion 408. Securing portion 408 is coupled to at least one base cable 208. Spring 418 is coupled to the securing portion 408.

Joint 402 includes flange 406 that is configured to couple to the shell of the car seat. For example, joint 402 may be secured to the shell of the car seat via a screw (or other fixing device) placed through the aperture located in the face of flange 406. Flange 406 may project orthogonally, or at an angle, from the remainder of joint 402. Joint 402 also includes a groove 404. Groove 404 is shaped to receive at least a part of the car seat base. For example, the car seat base may have a bar that fits into groove 404. The bar could then be secured in place by securing portion 408, as will be discussed below.

Securing portion 408 includes a travel 410. Travel 410 is a hole in the face of securing portion 408. Travel 410 may be curved and may be of even or approximately even width. Fixing element 416 fits within travel 410 and holds joint 402 and securing portion 408 in proximity to one another. When handle 202 is operated, handle 202 pulls base cable 208. Base cable 208 is coupled to securing portion 408 and pulls securing portion 408 along travel 410. In this manner, securing portion 408 may rotate around a point, for example axis 420, to the extent permitted by travel 410. Securing portion also includes a securing edge 412. Securing edge 412 is slightly wider than groove 404. When a bar or other part of the car seat base is present in groove 404, securing edge 412 holds the bar in place, preventing the bar from exiting groove 404. When the securing edge 412 is positioned to hold the bar in place, base connection mechanism 210 is in the closed position. Spring 418 is configured to bias securing portion 408 into the closed position, such that securing edge 412 is positioned to prevent the bar from exiting groove 404. When handle 202 is pulled, securing portion 408 rotates away from groove 404, and securing edge 412 is displaced such that the bar is no longer held in place. When the bar is no longer held in place within groove 404 by securing edge 408, base connection mechanism 210 is in the open position.

FIG. 4B illustrates the base connection mechanism 210 from a reverse angle compared to FIG. 4A.

Figure 5A:
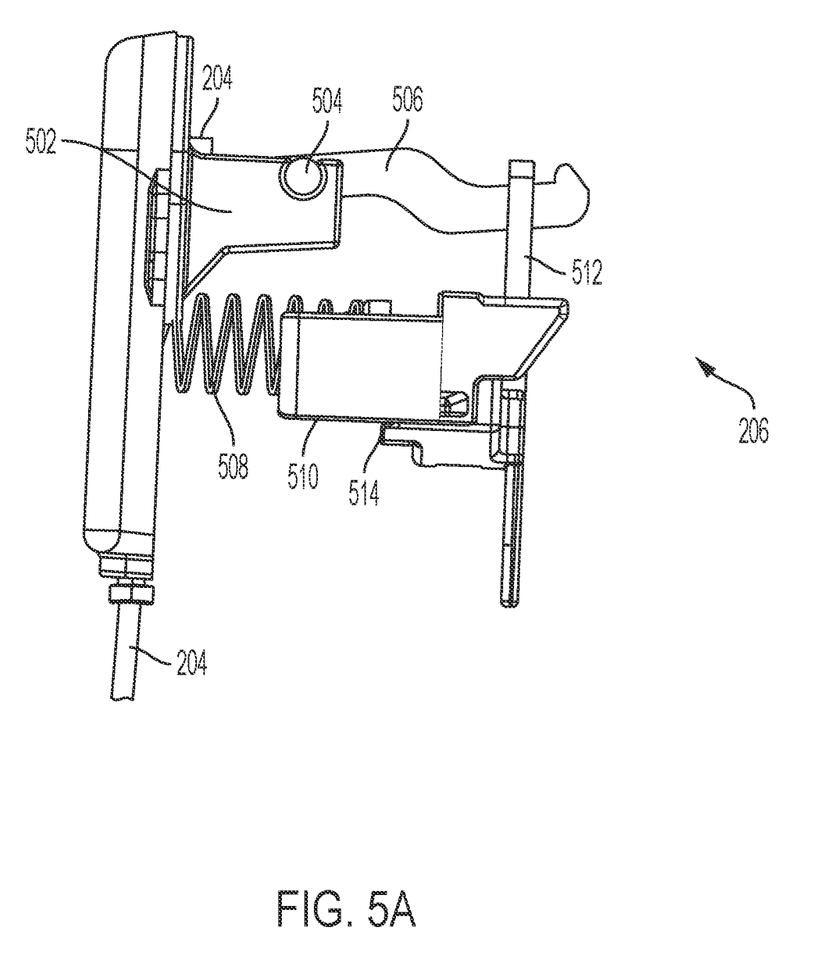
FIG. 5A illustrates a schematic diagram of a stroller connection mechanism from a side view according to an example.
Figure 5B:
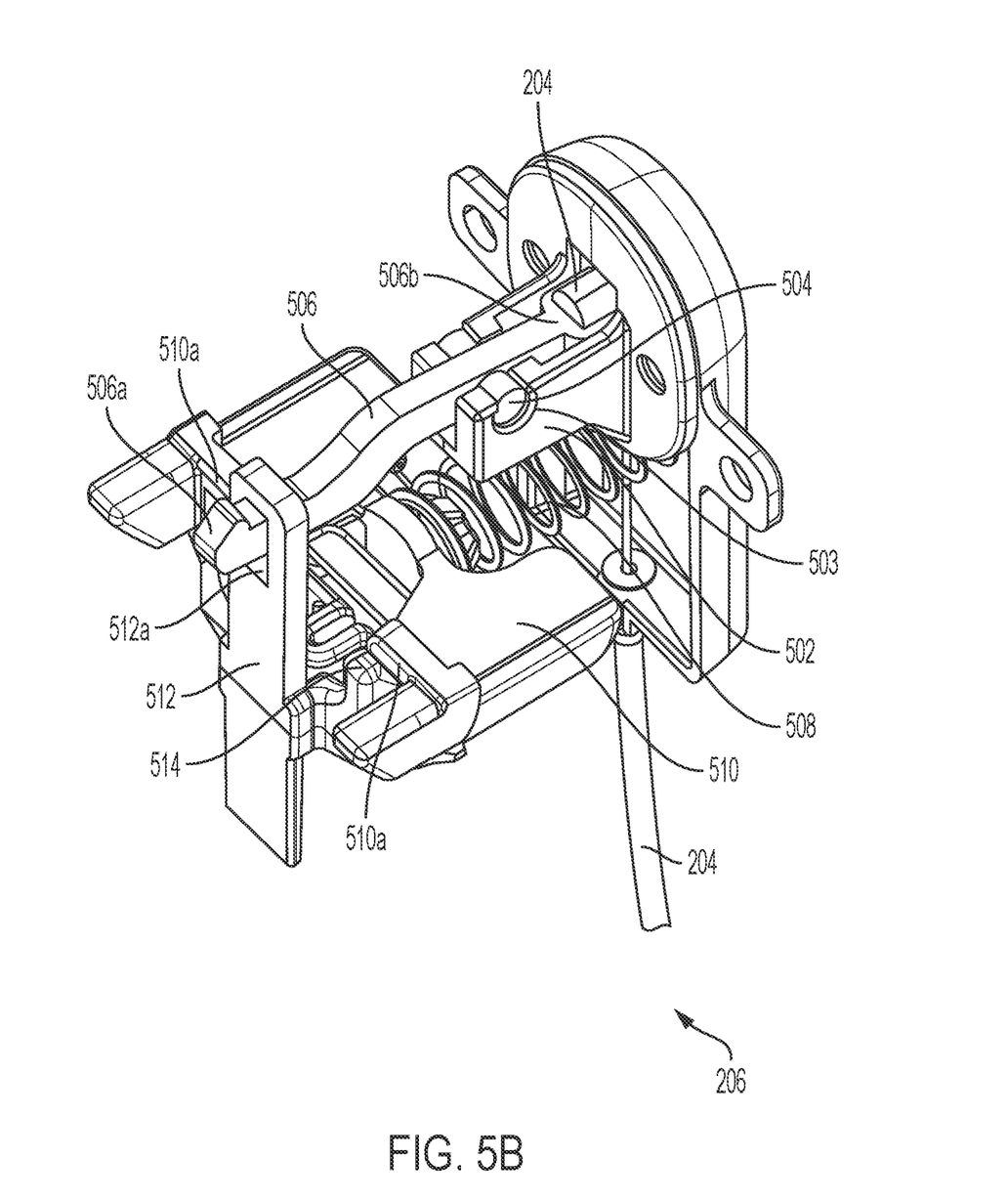
FIG. 5B illustrates a schematic diagram of the stroller connection mechanism from an oblique top-down view.
Figure 5C:
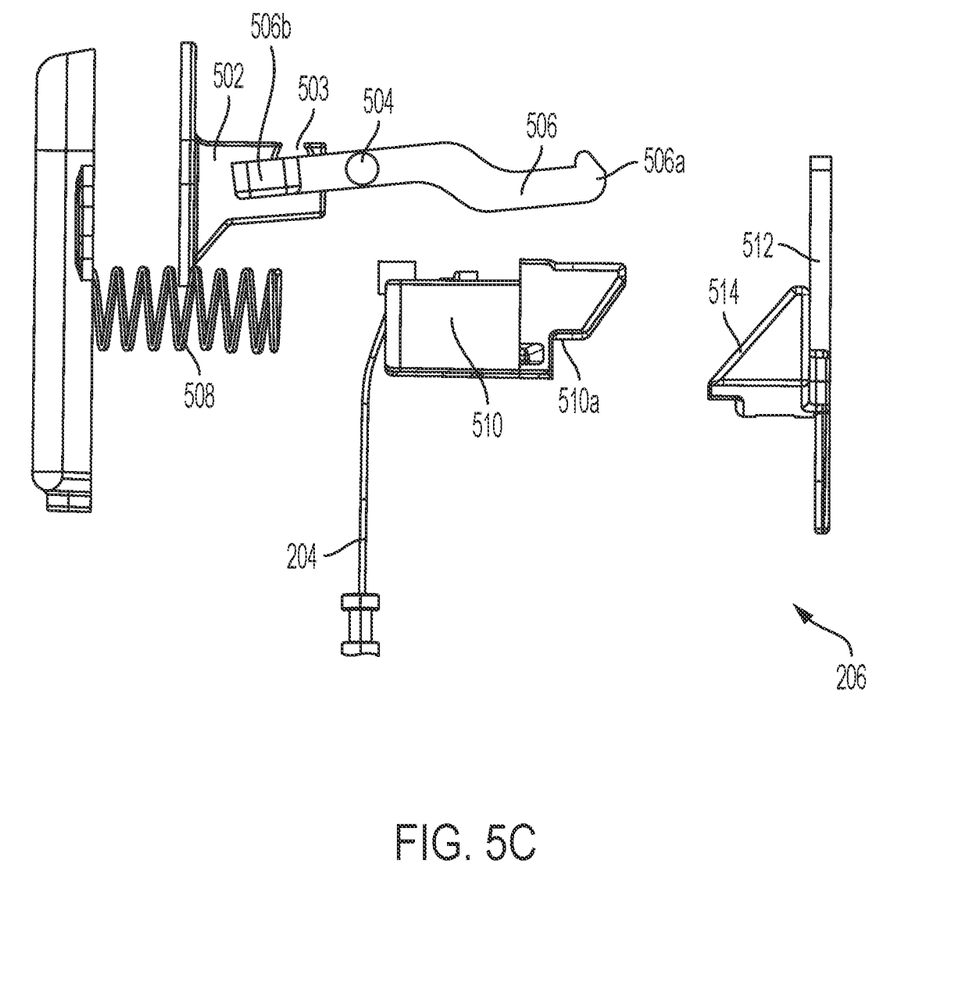
FIG. 5C illustrates a schematic diagram of the stroller connection mechanism from a partially exploded view.

FIGS. 5A-5C illustrates schematic diagrams of the stroller connection mechanism 206 according to an example.

FIG. 5A illustrates a schematic diagram of stroller connection mechanism 206 from a side-view. Stroller connection mechanism 206 includes a lodgment 502 for a hook 506, a pivot axis 504, a spring 508, a stroller securing portion (securing portion) 510, a latch 512, and a beveled edge 514 (discussed in greater detail in FIG. 5C).

Lodgment 502 is secured to a portion of car seat 100, and contains a circular aperture 503. Hook 506 includes a circular transverse component called the pivot axis 504 which is fit within circular aperture 503 of lodgment 502. Hook 506 is able to rotate about pivot axis 504. A spring 508 biases securing portion 510 into a closed position. Latch 512 includes an aperture (not shown) which admits the hook 506. Latch 512 further includes a beveled edge 514 slidably contacting a side 510a of securing portion 510. Hook 506 is further coupled to at least one stroller cable 204.

When handle 202 is operated, handle 202 pulls on stroller cable 204. Stroller cable 204 is coupled to hook 506 and pulls one end of hook 506 down. Hook 506 pivots at pivot axis 504 and the opposite end of hook 506 rises. The opposite end of hook 506 is within the aperture of latch 512. Hook 506 thus pulls latch 512 upward. As latch 512 moves upward, beveled edge 514 presses against the side of securing piece 510, forcing securing piece 510 to compress spring 508. When spring 508 is compressed by securing piece 510, stroller securing mechanism 206 is in the open position. When spring 508 is not compressed by securing piece 510 as described above, stroller securing mechanism 206 is in the closed position.

FIG. 5B illustrates a schematic diagram of the stroller connection mechanism 206 from an oblique top-down view.

Hook 506 has a latch-end 506a which is passed through the latch's 512 hole 512a. The latch-end 506a is the end of hook 506 that raises latch 512 upward when handle 202 is operated. Hook 506 also has a receiving end 506b for receiving the stroller cable 204 and securing it to hook 506. Securing portion 510 has a side 510a slidably in contact with beveled edge 514. Side 510a may be perpendicular or at an angle (i.e., complimentarily beveled with respect to beveled edge 514).

FIG. 5C illustrates a schematic diagram of the stroller connection mechanism 206 from an exploded view according to an example. The beveled edge 514 may be coupled to the latch 512.

The shell may be made from a single piece (for example, a single piece mold) or from multiple pieces joined together. Various locking mechanisms are possible. For example, the base connection mechanism need not retain a single bar for the car seat base, but may also lock into multiple bars or latch to the car seat base in other manners. The base connection mechanism may be located anywhere on the shell, including the sides and back. The stroller connection mechanism need not be located near the middle of the sides of the shell, but could be placed on the front and back of the shell, or biased forward or backward along the sides of the shell. The car seat may have one stroller connection mechanism or multiple. The car seat may have one base connection mechanism or multiple. The biasing mechanisms—the springs—need not be springs, but can be any device capable of generating a biasing force that tends to keep the connection mechanisms in the closed position. The handle may be located anywhere on the shell, and need not be located on the underside of the shell. The handle need not be a sliding mechanism, but can rotate or move in any other manner provided the movement tensions the cables. The cables may be made of any material, for example metals, plastics, synthetics, textiles, and so forth. Likewise, the shell, handle, connection mechanisms, and other parts of the car seat may be made of any suitable material, or any composites of suitable materials, and may be made from different materials than each other, for example metals, plastics, synthetics, textiles, and so forth. In some cases, parts may be fixed together. Such parts may be fixed using bolts, screws, nails, and other fixing elements, welds, or may be cast from the same piece, or otherwise fixed together in an appropriate manner.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A car seat release mechanism comprising:
    a shell;
    a first base connection mechanism coupled to the shell and configured to secure the shell to a car seat base, the first base connection mechanism having an open position and a closed position, a joint, a base securing portion rotationally coupled to the joint, the base securing portion including a travel, and a spring coupled to the base securing portion and configured to bias the base securing portion into the closed position;
    a first stroller connection mechanism coupled to the shell and configured to secure the shell to a stroller, the first stroller connection mechanism having an open position and a closed position, the first stroller connection mechanism including a hook, a latch configured to receive a hook, a stroller securing portion, and a spring configured to bias the stroller securing portion in the closed position; and
    a handle coupled to an underside of the shell and configured to operate both the first base connection mechanism and the first stroller connection mechanism.

2. The car seat release mechanism of claim 1 further comprising:
    one or more base cables coupled to the handle and coupled to the base connection mechanism, such that when the handle is pulled the base connection mechanism is in the open position; and
    one or more stroller cables coupled to the handle and to the stroller connection mechanism, such that when the handle is pulled the stroller connection mechanism is in the open position.

3. The car seat release mechanism of claim 2 further comprising a second base connection mechanism, wherein the first base connection mechanism is coupled to a first side of the shell, and the second base connection mechanism is coupled to a second side of the shell.

4. The car seat release mechanism of claim 3 further comprising:
    a first base cable coupled to the first base connection mechanism; and
    a second base cable coupled to the second base connection mechanism.

5. The car seat release mechanism of claim 2 wherein pulling the handle operates both the base and stroller connection mechanisms simultaneously.

6. The car seat release mechanism of claim 1 wherein the joint includes a flange configured to secure the base connection mechanism to the shell.

7. The car seat release mechanism of claim 1 wherein the base securing portion is configured to rotate with respect to the travel.

8. A car seat release mechanism comprising:
    a shell;
    a first base connection mechanism coupled to the shell and configured to secure the shell to a car seat base, the first base connection mechanism having an open position and a closed position;
    a first stroller connection mechanism coupled to the shell and configured to secure the shell to a stroller, the first stroller connection mechanism having an open position and a closed position, the first stroller connection mechanism including a hook, a latch configured to receive a hook, a stroller securing portion including one or more sides, and a spring configured to bias the stroller securing portion in the closed position; and
    a handle coupled to an underside of the shell and configured to operate both the first base connection mechanism and the first stroller connection mechanism, wherein
    the latch includes an aperture configured to receive the hook and one or more beveled edges, wherein the one or more beveled edges are slidably positioned relative to the one or more sides.

9. The car seat release mechanism of claim 8 wherein the latch is configured to slide upwards responsive to the handle being operated, such that the stroller securing portion is shifted to the open position.

10. The car seat release mechanism of claim 8 further comprising a second stroller connection mechanism, wherein the first stroller connection mechanism is coupled to a first side of the shell, and the second stroller connection mechanism is coupled to a second side of the shell.

11. The car seat release mechanism of claim 10 further comprising:
    a first stroller cable coupled to the first stroller connection mechanism; and
    a second stroller cable coupled to the second stroller connection mechanism.

12. A car seat connection mechanism comprising:
    a shell; and
    a connection mechanism having:
        an open and closed position,
        a stroller connector configured to connect to a stroller and operable between the open and closed positions, the stroller connector including a hook, a latch configured to receive the hook, a stroller securing portion, and a spring configured to bias the securing portion into the closed position, a base connector configured to connect to a car seat and operable between the open and closed positions, at least one stroller cable coupled to the stroller connector, at least one base cable coupled to the base connector, a hook, a latch configured to receive the hook, a securing portion, a spring configured to bias the securing portion into the closed position, and a handle configured to operate the connection mechanism between the open and closed positions.

13. The car seat connection mechanism of claim 12 wherein the connection mechanism further comprises:
   a first stroller connector portion on a first side of the shell;
   a second stroller connector portion on a second side of the shell;
   a first stroller cable coupled to the handle and to the first stroller connector portion; and
   a second stroller cable coupled to the handle to the second stroller connector portion.

14. The car seat connection mechanism of claim 12 wherein the connection mechanism further comprises:
   a first base connector portion on a first side of the shell;
   a second base connector portion on a second side of the shell;
   a first base cable coupled to the handle and to the first base connector portion; and
   a second base cable coupled to the handle and to the second base connector portion.

15. The car seat connection mechanism of claim 12 wherein the base connector has a base open position and a base closed position and the stroller connector has a stroller open position and a stroller closed position.

16. The car seat connection mechanism of claim 15 wherein the handle is configured to operate the base connector between the base open position and the base closed position and is configured to operate the stroller connector between the stroller open position and the stroller closed position.

17. The car seat connection mechanism of claim 16 wherein the handle is configured to operate the base connector and the stroller connector simultaneously.

18. The car seat connection mechanism of claim 12 wherein the latch includes an aperture configured to receive the hook and at least one beveled edge; the securing portion includes at least one side slidably positioned with respect to the at least one beveled edge; and the at least one stroller cable is coupled to the hook.

19. The car seat connection mechanism of claim 12 wherein the base connector further comprises:
   a joint;
   a securing portion rotationally coupled to the joint; and
   a spring configured to bias the base securing portion in the closed position.

20. The car seat mechanism of claim 19 wherein the securing portion is coupled to the at least one base cable.

* * * * *